United States Patent [19]

Kurz et al.

[11] 3,950,312

[45] Apr. 13, 1976

[54] VINYL CHLORIDE TERPOLYMERS SOLUBLE IN AROMATIC COMPOUNDS AND METHOD FOR THEIR PRODUCTION

[75] Inventors: Dieter Kurz; Herbert Kandler; Alex Sabel; Johann Bauer, all of Burghausen, Germany

[73] Assignee: Wacker-Chemie GmbH, Munich, Germany

[22] Filed: Jan. 21, 1974

[21] Appl. No.: 435,205

[30] Foreign Application Priority Data
Jan. 31, 1973 Germany............................ 2304663

[52] U.S. Cl. 260/78.5 CL; 260/22 CB; 260/32.8 R; 260/33.6 R; 260/78.5 B
[51] Int. Cl.² C08F 2/26; C08F 222/14; C08F 222/16
[58] Field of Search.... 260/78.5 CL, 78.5 B, 32.8 R

[56] References Cited
UNITED STATES PATENTS

| | | | |
|---|---|---|---|
| 2,839,509 | 6/1958 | Garner............................... | 260/78.5 |
| 2,958,668 | 11/1960 | Carr et al......................... | 260/29.6 |
| 3,027,358 | 3/1962 | Ebersbach et al................ | 260/78.5 |

FOREIGN PATENTS OR APPLICATIONS

| | | | |
|---|---|---|---|
| 622,823 | 6/1961 | Canada....................... | 260/78.5 CL |

Primary Examiner—John Kight, III
Attorney, Agent, or Firm—Hammond & Littell

[57] ABSTRACT

Vinyl chloride terpolymers soluble in aromatic compounds with a K-value of from 25 to 38, measured in cyclohexanone consisting of an emulsion polymerized monomer mixture of from 65% to 80% by weight of vinyl chloride,
15% to 27% by weight of a diester of maleic acid and/or fumaric acid with multiple-branched alkanols having 9 to 15 carbon atoms, and
3% to 15% by weight of a monoester of maleic acid and/or fumaric acid with multiple-branched alkanols having 9 to 15 carbon atoms;

as well as the process of their preparation by pre-emulsification of the mono and di esters in the aqueous phase with an anionic emulsifier prior to polymerization with vinyl chloride.

2 Claims, No Drawings

3,950,312

VINYL CHLORIDE TERPOLYMERS SOLUBLE IN AROMATIC COMPOUNDS AND METHOD FOR THEIR PRODUCTION

Varnish resins based on vinyl chloride terpolymers which are produced from vinyl chloride, diesters of maleic acid, chlormaleic acid and fumaric acid, as well as at least one monoester of the said acids in aqueous suspension have previously been reported in the German Published Application DAS No. 1,013,427. The alcohol moieties of the maleic and fumaric di and half esters are hydrocarbon radicals with 1 to 10 carbon atoms. Preferred diesters are diethyl maleate, di-n-butyl maleate and di-(2-ethylhexyl) maleate, as well as a mixture of about equal parts of di-n-butyl maleate and di-n-butyl fumarate. Mono-n-butyl maleate or monocyclohexyl maleate are the preferable monoester. The varnish resins produced are only to a minor extent clearly soluble in toluene and the alkydresin compatibility is within limits which no longer meet today's high requirements for a high-grade varnish resin. The compatibility with cheap solvents, such as low-boiling paraffin hydrocarbons, which are frequently used in the varnish industry for dilution is also insufficient, and these resins no longer have an adequate benzine dilution value.

OBJECTS OF THE INVENTION

An object of the invention was therefore to find vinyl chloride terpolymers which dissolve completely clear in aromatic solvents, can be diluted without turbidity with benzine within wide limits, and which have a greater alkyd resin-compatibility compared to the state of the art, and to discover a production method for the terpolymers.

Another object of the present invention is the development of vinyl chloride terpolymers soluble in aromatic compounds and having a K-value of from 25 to 38, measured in cyclohexanone, consisting essentially of an emulsion polymerized monomer mixture of from:
  65% to 80% by weight of vinyl chloride,
  15% to 27% by weight of a diester of an acid selected from the group consisting of maleic acid, fumaric acid, and mixtures thereof, with an alkanol having from 9 to 15 carbon atoms and more than one branched chain, and
  3% to 15% by weight of a monoester of an acid selected from the group consisting of maleic acid, fumaric acid and mixtures thereof, with an alkanol having from 9 to 15 carbon atoms and more than one branched chain.

A further object of the present invention is the development of a method for the production of the above vinyl chloride terpolymers comprising the steps of pre-emulsifying the mono and diesters in an aqueous phase in the presence of from 0.1% to 0.8% by weight, based on the total monomers, of an anionic emulsifier and thereafter adding the vinyl chloride, polymerizing the mixture in the presence of water-soluble polymerization catalysts, and polymerization regulators at temperatures of from 60°C to 80°C, and recovering said vinyl chloride terpolymers.

These and other objects of the present invention will become more apparent as the description thereof proceeds.

DESCRIPTION OF THE INVENTION

The invention relates to terpolymers consisting of:
  65% to 80% by weight of vinyl chloride
  15% to 27%, preferably 15% to 25%, by weight of a diester of maleic acid and/or fumaric acid with multiple-branched-chain alcohols of a chain length of 9 to 15 carbon atoms and
  3% to 15%, preferably 5% to 15%, by weight of a monoester of maleic acid and/or fumaric acid with multiple-branched-chain alcohols of a chain length of 9 to 15 carbon atoms, said terpolymer having a K-value of 25 to 38, measured in cyclohexanone.

More particularly, the invention relates to vinyl chloride terpolymers soluble in aromatic compounds and having a K-value of from 25 to 38, measured in cyclohexanone, consisting essentially of an emulsion polymerized monomer mixture of from:
  65% to 80% by weight of vinyl chloride,
  15% to 27% by weight of a diester of an acid selected from the group consisting of maleic acid, fumaric acid and mixtures thereof, with an alkanol having from 9 to 15 carbon atoms and more than one branched-chain, and
  3% to 5% by weight of a monoester of an acid selected from the group consisting of maleic acid, fumaric acid and mixtues thereof, with an alkanol having from 9 to 15 carbon atoms and more than one branched chain.

In addition, the invention relates to a method for the production of the terpolymers by polymerization of vinyl chloride, mono and di esters of maleic acid and/or fumaric acid with multiple-branched-chain alcohols of a chain length of 9 to 15 carbon atoms in the aqueous phase in the presence of watersoluble catalysts, emulsifiers and regulators, characterized in that the mono and di esters are pre-emulsified in the aqueous phase by the addition of from 0.1% to 0.8% by weight, based to the total monomer amount, of anionic emulsifiers, that the vinyl chloride is then added, and that the polymerization is carried out at a temperature of 60°C to 80°C.

Surprisingly it was found that terpolymers of vinyl chloride with mono and di esters of maleic and/or fumaric acid with alkanols having a chain length of 9 to 15 carbon atoms and multiple branchings have particularly good properties as varnish resins. Thus, their solubility in aromatic compounds is excellent, while they have at the same time a substantially higher benzene compatibility, compared to the known resins. In addition, the alkyd resin-compatibility is decisively improved, compared to the known products.

The quantitative amounts of monoester and diester can be varied within the indicated limits. Mixtures of diesters, as well as of monoesters can also be used. Both the acid component and the alcohol component can be different. It is also possible to use monoesters and diesters which consist of different components, both with regard to the acid component and with regard to the alcohol component.

Examples of alkanols with multiple branchings are oxoalcohols, e.g. isononyl alcohol (3 branches), isodecyl alcohol (over 2 branches), isotridecyl alcohol (3 branches), as well as diisobutyl carbinol (3 branches). In order to be suitable for the invention, the alcohols must have at least 2 branched chains, mostly they have between 2 and 4 branches, preferably 3 branches. It is possible to use both primary and secondary alcohols. In general, aliphatic saturated acylic alcohols (alkanols) are used.

The K-value of the terpolymers amounts to 25 to 38, measured in cyclohexanone (according to Fikentscher, *Cellulosechemie* 13, (1932), p. 60). The proper K-value is attained by the use of chain-length regulators, mostly in amounts of 2% to 8% by weight, based on the total monomer amount, and also by the polymerization temperature which is maintained between 60°C and 80°C.

The terpolymers are produced in an aqueous emulsion, since polymerization in an aqueous suspension leads to products of lower quality with poor dissolving properties and partial incompatibilities with alkyd resins.

Of decisive importance for the production is the pre-emulsification of the monoesters and diesters with the emulsifier in the aqueous phase. The catalyst and the regulator as well as other polymerization aids can also be charged at this time. The latter can also be added, however, after the pre-emulsification.

The pre-emulsification is effected by means of a homogenizing apparatus. These machines exert shearing forces on the oil-water mixtures, so that stable emulsions are formed which no longer separate, even when left standing. Examples of such machines are the Supraton (see German Pat. DBP 956,302), or the Ultraturax. Without this pre-emulsification, products are obtained whose quality is lower, as far as their suitability as a varnish resin is concerned.

After the pre-emulsification, the emulsion, the remaining polymerization aids and vinyl chloride are introduced into an autocalve and polymerized, optionally with stirring, under autogenous pressure of the vinyl chloride. The pressure is mostly between 5 and 10 atmospheres.

It is advantageous and surprising that only small amounts of emulsifiers (0.1% to 0.8% by weight related to the total monomer) are required in the method according to the invention, compared to the known pre-emulsification methods. Preferred are anionic emulsifiers, such as sulfonated or sulfated organic compounds where the organic compound is hydrophobic, for example, alkyl sulfonates, alkyl sulfates, alkylbenzene sulfonates, sulfonated alkyl esters of higher fatty acids, sulfated ethers; alkali metal salts and ammonium salts of higher fatty acids, such as sodium laurate and ammonium stearate.

Examples of molecular weight regulators are aliphatic aldehydes (alkanals), chlorinated hydrocarbons, such as di and trichloroethylene, chloroform, mercaptans, cyclohexene, propylene and isobutylene.

The water-soluble percompounds known for emulsionpolymerization can be used as catalysts, such as ammonium, sodium, or potassium peroxydisulfate and hydrogen peroxide in amounts of 0.05% to 0.5% by weight, based on the monomers. They can also be employed together with reducing agents, such as thiosulfates, rongalite, dithionites, sulfites, as well as mixtures thereof, mostly in amounts of 0.01% to 0.1% by weight, based on the monomers. Either the reducing agent or the peroxide can be added during the polymerization corresponding to the consumption, if the other component is percharged.

The monomer-water ratio is not critical. In general, the monomer content is not less than 20% by weight and not more than 60% by weight.

The terpolymer dispersions thus produced are coagulated by known measures, for example, by the addition of ionic compounds, then they are filtered, washed and dried.

The terpolymers according to the invention are preferably used as varnish resins. They can be used alone or together with other varnish resins, particularly with alkyd resins. They show particularly good adhesion on metals, so that they are suitable for such varnishes, particularly for light metal varnishes. The varnishes are furthermore resistant to moisture and chemicals, and are thus suitable as a protection against corrosion. In addition, they adhere very firmly on alkaline reacting foundations.

The following examples are illustrative of the invention without being limitative in any respect.

EXAMPLES

The polymerization of the monomers, in the proportions as indicated in the Table, was carried out as follows:

The diester and the monoester of maleic acid and/or fumaric acid were pre-emulsified corresponding to the quantitative ratios indicated in the Table, in 600 parts by weight of fully deionized water, which combined in solution 1 part by weight of potassium persulfate, as well as 0.1 to 1.0 parts by weight of sodium alkylbenzene sulfonate as an emulsifier, until a stable emulsion was obtained. Then the emulsion was introduced into an autoclave equipped with a stirrer and 17.5 parts by weight of vinyl chloride, as well as the corresponding amounts of molecular weight regulators were added (see Table). The mixture was polymerized at 70°C until an end pressure of 1.5 atmospheres. The latices thus produced were coagulated in known manner by ionic additives. After filtering, washing and drying, a terpolymer in powder form was obtained.

Examples 1 to 5 were directed to monomer combinations which were known from the state of the art. Examples 6 to 14 covered compositions according to the invention.

The following tests served to evaluate the suitability of the terpolymers as varnish resins:
1. alkyd resin compatibility
2. solubility in aromatic compounds
3. benzine dilution value.

For the determination of the alkyd resin compatibility, 20% solutions, both of the varnish resins and of the alkyd resins in methylethyl ketone were prepared. These solutions were mixed in a ratio of 3:1, 1:1 and 1:3, so that the alkyd resin content of the solution mixture was 25%, 50% and 75% by weight, respectively. The solutions thus prepared were poured on a glass plate, dried in air in the course of a day, and finally evaluated by microscopic observations according to the following grades:
1. compatible
2. compatible with slight disturbances
3. moderately compatible
4. incompatible The following alkyd resins sold by Bayer of Leverkusen were tested:
Alkydal L 49, a linseed oil-alkyd resin, 32% phthalic acid, 50% oil content
Alkydal L 67, a linseed oil-alkyd resin, 23% phtalic acid, 67% oil content
Alkydal L 65, a soybean oil-alkyd resin, 26% phthalic acid, 63% oil content.

For the evaluation of the solubility in aromatic compounds, a 20% solution in Solvesso 150 (Esso-Chemie GmbH, Hamburg) was prepared and evaluated for clarity. Solvesso is a solvent fraction boiling between 177°C and 206°C, which contains 98% by volume of aromatic compounds which consist primarily of tetramethyl benzene; its solubility parameter δ according to Burrell, FATIPEC Congress 1962, p. 21 is 8.5.

For the evaluation of the relative benzine dilution value, 25 ml of a resin solution of 10 gm of varnish resin in 100 ml xylene and 4 ml ethanol in a beaker were titrated with n-hexane until a mark provided on the back of the beaker could no longer be seen, due to turbidity. The amount of n-hexane served as a measure for the benzine dilution value.

The various values are given in the Table.

TABLE

| Example: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Diester*) | DBM | DBM | DIBM | DBM | DEHM | DINM | DINM | DINM | DINM | DITDM | DIDM | BDIBCM | DINF | BDIBCM |
| Monoester*) | MBM | MBM | MIBM | MCHM | MBM | MINM | MINM | MINM | MITDM | MITDM | MIDM | MINM | MINM | MINM |
| Vinyl chloride (p/w.) | 175 | 175 | 175 | 175 | 175 | 175 | 175 | 175 | 175 | 175 | 175 | 175 | 175 | 175 |
| Diester (p/w.) | 55 | 60 | 55 | 55 | 55 | 65 | 55 | 48 | 55 | 50 | 55 | 50 | 55 | 62.5 |
| Monoester (p/w.) | 20 | 15 | 20 | 20 | 20 | 10 | 20 | 27 | 20 | 25 | 20 | 25 | 20 | 12.5 |
| Trichloroethylene (p/w.) | 12 | 11 | 10 | 10 | 10 | 13 | 13 | 13 | 13 | 11 | 12 | 12 | 13 | 10 |
| K-value of the terpolymer | 30 | 30 | 31 | 34 | 32 | 33 | 33 | 33 | 32 | 34 | 32 | 33 | 33 | 34 |
| 1. Alkyd resin compatibility in methylethyl ketone: | | | | | | | | | | | | | | |
| Alkydal L 49 | | | | | | | | | | | | | | |
| 25%/w. | 2 | 3 | 2 | 2 | 1 | 1 | 1 | 1 | 1 | 1 | 1 | 1 | 1 | 1 |
| 50%/w. | 2 | 2 | 2 | 2 | 1 | 1 | 1 | 1 | 1 | 1 | 1 | 1 | 1 | 1 |
| 75%/w. | 1 | 1 | 1 | 2 | 1 | 1 | 1 | 1 | 1 | 1 | 1 | 1 | 1 | 1 |
| Alkydal L 67 | | | | | | | | | | | | | | |
| 25%/w. | 4 | 4 | 4 | 4 | 3 | 2 | 2 | 1 | 2 | 2 | 1 | 2 | 2 | 2 |
| 50%/w. | 3 | 3 | 3 | 4 | 2 | 1 | 1 | 1 | 1 | 2 | 1 | 1 | 2 | 2 |
| Alkydal S 65 | | | | | | | | | | | | | | |
| 25%/w. | 4 | 4 | 4 | 4 | 3 | 1 | 1 | 1 | 1 | 1 | 1 | 2 | 2 | 2 |
| 50%/w. | 3 | 3 | 3 | 4 | 2 | 1 | 1 | 1 | 1 | 1 | 1 | 1 | 1 | 2 |
| 75%/w. | 3 | 3 | 3 | 4 | 1 | 1 | 1 | 1 | 1 | 1 | 1 | 1 | 1 | 1 |
| 2. Solubility in Solvesso 150 (aromatic compound solubility) | | | | | | | | | | | | | | |
| 20% solution | tb. | sl.tb. | tb. | tb. | tb. | cl. | cl. | cl. | cl. | cl. | cl. | cl. | cl. | cl. |
| 3. Benzine dilution value | | | | | | | | | | | | | | |
| n-hexane (ml) | 7 | 8 | 7 | 6 | 9 | 18 | 16 | 15 | 16 | 15 | 17 | 18 | 15 | 22 |

*) Abbreviations:
DBM = dibutyl maleate
DIBM = diisobutyl maleate
DEHM = di-2-ethylhexyl maleate
DINM = diisononyl maleate
DIDM = diisodecyl maleate
DITDM = diisotridecyl maleate
DINF = diisononyl fumarate
tb. = turbid;    sl.tb. = slightly turbid;    cl. = clear MBM = monobutyl maleate
MIBM = monoisobutyl maleate
MCHM = monocyclohexyl maleate
MINM = monoisononyl maleate
MIDM = monoisodecyl maleate
MITDM = monoisotridecyl maleate
BDIBCM = bis-diisobutylcarbinol maleate The preceding specific embodiments are illustrative of the practice of the invention. It is to be understood, however, that other expedients known to those skilled in the art or disclosed herein may be employed without departing from the spirit of the invention or the scope of the appended claims.

We claim:

1. Vinyl chloride terpolymers soluble in aromatic compounds and having a K-value of from 25 to 38, measured in cyclohexanone, consisting essentially of an emulsion polymerized monomer mixture of from:
   65% to 80% by weight of vinyl chloride,
   15% to 27% by weight of a diester of an acid selected from the group consisting of maleic acid, fumaric acid and mixtures thereof, with an alkanol having from 9 to 15 carbon atoms and more than one branched chain, and
   3% to 15% by weight of a monoester of an acid selected from the group consisting of maleic acid, fumaric acid and mixtures thereof, with an alkanol having from 9 to 15 carbon atoms and more than one branched chain.

2. The terpolymer of claim 1 wherein said monomer mixture contained from 65% to 80% by weight of said vinyl chloride, from 15% to 25% by weight of said diester and from 5% to 15% by weight of said monoester.

* * * * *